US006116036A

United States Patent [19]
Canavesi et al.

[11] Patent Number: 6,116,036
[45] Date of Patent: Sep. 12, 2000

[54] SELF REGULATING DEVICE FOR CONTROLLING REFRIGERATORS AND FREEZERS

[75] Inventors: Mauro Canavesi, Locate Varesino; Gianpaolo Ramelli, Taino, both of Italy

[73] Assignee: Whirlpool Corporation, Benton Harbor, Mich.

[21] Appl. No.: 09/359,469

[22] Filed: Jul. 22, 1999

[30]     Foreign Application Priority Data

Jul. 29, 1998  [IT]  Italy .................................. MI98A1764

[51] Int. Cl.[7] .................................................... F25B 1/00
[52] U.S. Cl. ............................................... 62/227; 62/157
[58] Field of Search ............................ 62/227, 229, 157, 62/158, 231; 165/243

[56]               References Cited

U.S. PATENT DOCUMENTS

| | | |
|---|---|---|
| 5,152,151 | 10/1992 | Jarosch ..................................... 62/115 |
| 5,218,836 | 6/1993 | Jarosch ..................................... 62/227 |
| 5,699,674 | 12/1997 | Lee et al. .................................. 62/115 |
| 5,992,163 | 11/1999 | Baruschke et al. ....................... 62/156 |

*Primary Examiner*—William Doerrler
*Assistant Examiner*—Marc Norman
*Attorney, Agent, or Firm*—Robert O. Rice; Joel M. Van Winkle; Stephen D. Krefman

[57]               ABSTRACT

A self-regulating device for controlling refrigerating appliances, such as refrigerators or freezers, preferably domestic, which comprise a refrigerating circuit with compressor, evaporator, condenser and controlling means of the compressor with a temperature sensor placed in contact with the evaporator, where said means of controlling the compressor is a microprocessor device which records and processes the temperature of the evaporator and at least one of the following two parameters: the compressor functioning time and the time during which the compressor is inactive and compares said time(s) with one or more tabulated values, in order to ensure that the disconnection time ($t_r$) of the compressor reaches and maintains, by self-regulation, a constant predetermined tabular value ($t_{r1}$).

10 Claims, 1 Drawing Sheet

SELF REGULATING DEVICE FOR CONTROLLING REFRIGERATORS AND FREEZERS

BACKGROUND OF THE INVENTION

1. Field of the Invention

The present invention relates to a control device for refrigerating or freezer appliances, preferably domestic appliances, comprising a refrigerating circuit with compressor, evaporator, condenser and unit for regulating the temperature of the refrigerator, equipped with a temperature sensor placed in contact with the evaporator.

2. Description of the Related Art

The temperature control means, in contrast to the electromechanical systems, nowadays comprise an electronic device and allow the compressor to be controlled in relation to the temperature recorded by temperature sensors present on the appliance, for example, within its interior.

The internal temperature of the appliance to be controlled depends upon variations in the ambient external temperature, the frequency of access to the interior of the refrigerator, the amount of stuff contained within it, the ageing of the insulation and the efficiency of the refrigerating circuit. To take these factors into account complex control circuits are used which require more than one temperature sensor and other recording devices, for example a sensor to record the frequency in opening the refrigerator.

This relative complexity of the control circuit brings certain disadvantages both in terms of components and labour and in terms of efficient management to ensure that the product is as economic as possible to produce.

SUMMARY OF THE INVENTION

The main aim of the present invention is to produce a self-regulating device to control the functioning of the above-mentioned appliances, using a single temperature sensor on the evaporator and an electronic circuit connected to the sensor in such a way to achieve a number of advantages such as:

- the internal temperature of the refrigerator or freezer is maintained and regulated independently of the variations in the external ambient temperature which are automatically compensated.
- Possibility of regulating the internal temperature of the appliance (refrigerator or freezer) by automatically correcting any faults in the appliance due to problems in the refrigerating circuit and in the ageing of the insulation.
- Continuous and automatic optimization of the compressor functioning time to maintain the required temperature and consequent optimization of energy consumption.
- Possibility of ensuring the defrost of the evaporator (for refrigerating appliances), depending upon the compressor functioning time.
- Rational use of the compressor even in conditions of extreme ambient temperatures.

These aims and advantages, in addition to others which are set out in full in the following detailed description, are achieved with a self controlling device conforming the attached claims.

BRIEF DESCRIPTION OF THE DRAWINGS

A clearer understanding of the invention will be gained from the following detailed description, which is given as an example and it is therefore not imitative, of a preferred embodiment of the invention shown in the attached drawing in which.

DESCRIPTION OF THE PREFERRED EMBODIMENT

Figure 1:
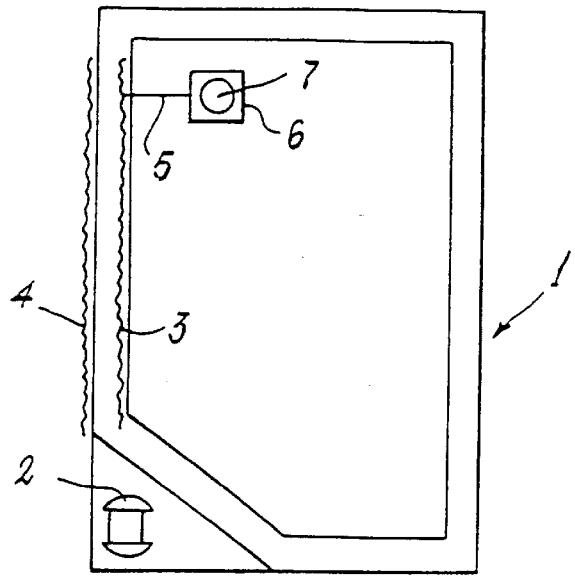
FIG. 1 is a cross-sectional view of a refrigerator in diagrammatic form.

With reference to FIG. 1, the refrigerating appliance is marked with the reference number 1; in the example given this is a simple domestic refrigerator.

However, the invention in question is applicable to other types of refrigerating appliances, such as, for example, both chest and upright freezers.

The refrigerating appliance 1 comprises a conventional refrigerating circuit, essentially including a compressor 2, an evaporator 3 and a condenser 4. There is a conventional temperature sensor 5 placed in contact with the evaporator 3 which is read by an electronic (microprocessor) circuit 6 and by which the user may set the required temperature inside the refrigerating appliance. The electronic circuit controls the compressor on the basis of two different temperature values (high and low) recorded on the evaporator 3 by the temperature sensor 5 in order to obtain the temperature set by the user.

Figure 2:
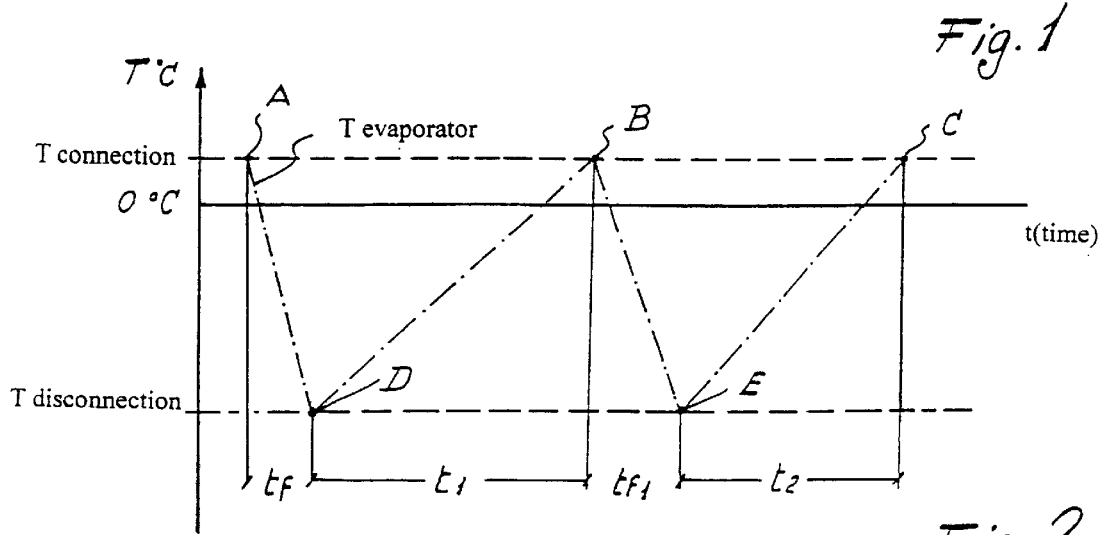
FIG. 2 is a graph showing the changes in the temperature of the evaporator as a function of the time, without the control device according to the invention.

If (with the use of a single temperature sensor) the control device was designed to maintain a constant differential of temperature between compressor connection and disconnection, the situation shown in FIG. 2 would be noted. This is a diagrammatic illustration of the change in temperature (T) as a function of time (t) recorded by the sensor 5 placed in contact with the evaporator, where the points A, B, C plotted on a single straight-line $T_{connection}$ ordinate indicate the temperature at which the compressor 2 is activated, whilst points D, E, plotted on a single straight-line $T_{disconnection}$ ordinate indicate the temperature at which the compressor 2 is deactivated. The $T_{connection}-T_{disconnection}$ differential is assumed to be constant, i.e. it does not vary even in the case where the user wishes to change the temperature inside the refrigerator; for example where a higher temperature than that shown in the example in FIG. 2 is required, both the $T_{connection}$ and the $T_{disconnection}$ would be subject to an equal increase, thus maintaining a constant differential.

With an assumed constant $T_{connection}$ temperature, it is noted that in a control device of this type, i.e. constant T differential, the times between connection and disconnection vary as a function, for example, of the external temperature with a given parity of $T_{connection}$. This can be seen in FIG. 2 in which it is assumed that in the cycle between the points A, D, C, the external temperature has a given value which is lower than that of the cycle formed by the points B, E, C. In fact the time $t_f$ (compressor functioning time) of the ADB cycle is less than the corresponding time $t_{f1}$ of the BEC cycle, whilst $t_1$ (compressor disconnection—time during which the compressor is not functioning) of the ADB cycle is greater than $t_2$ of the BEC cycle.

A single sensor control device of this type would have a series of disadvantages such as the variations in the internal temperature due to changes in the external temperature, differences in the circuit performances due to ageing of the insulation, increased energy consumption due to the fact that the compressor is not being put to optimal use.

The control device according to the invention operates in a different manner, by means of an algorithm operated by software resident in the microprocessor 6 which acquires and processes the temperature of the sensor 5 and at least one of the following: functioning (connection) time of the compressor 2, compressor disconnection (non-functioning) time, comparing these to a reference value and changing the above-mentioned differential.

Briefly, the assembly comprising: 1) an evaporator (preferably a plate evaporator with its heat capacity); 2) a temperature sensor placed on the evaporator; 3) a timer (operated by the microprocessor) for measuring the time taken for the temperature of the evaporator to rise and/or fall.

These parts operating together constitute a sensor for recording the variation in the heat dispersion of the appliance. Once this is recorded the microprocessor software acts in order to compensate the variations in the heat dispersion of the appliance by changing the $T_{disconnection}$ after processing said parameters (compressor functioning time, length of time during which the compressor is inactive, sensor temperature).

Figure 3:
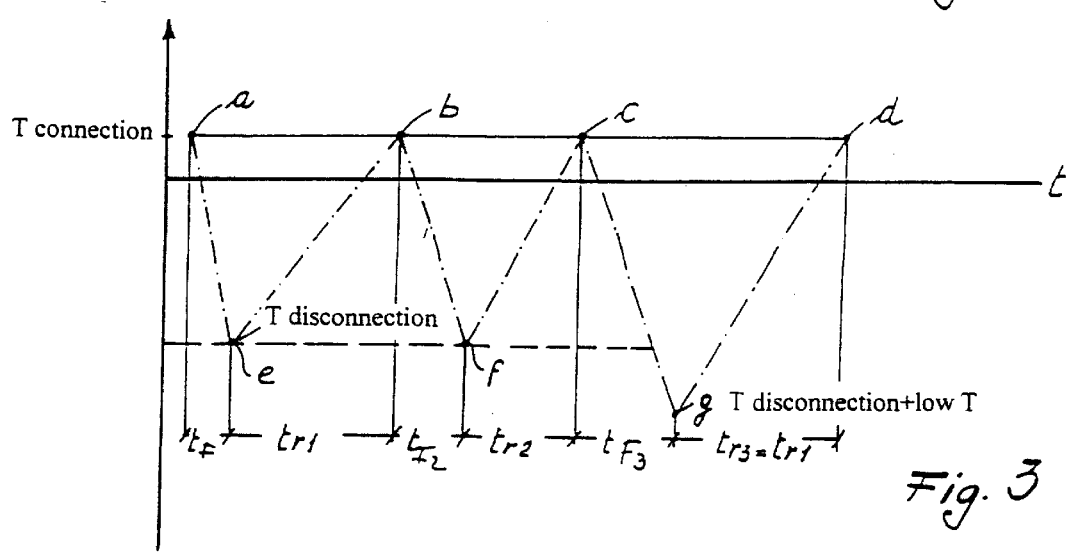
FIG. 3 shows a similar graph with temperature, but with the use of the control device according to the invention.

A clearer understanding of the control device according to the invention will be gained with reference to FIG. 3 which shows, in diagrammatic form, the temperature T of the evaporator 3 as a function of the time t and in which the points a, b, c, d lying on the same $T_{disconnection}$ temperature line show the temperature at which the compressor initially begins to function, whilst points e, f, g represent the compressor disconnecting points and the broken and dotted lines which join said points represent the changes in the temperature of the evaporator 3.

By experimentation on a refrigerator or freezer of a given type, it is possible to determine the time $t_{r1}$ required for the evaporator temperature to rise from the disconnection temperature "e" to the reconnection temperature "b" under standard conditions of heat dispersion correlated to a predetermined external temperature, for example 25° C. This time, together with the associated temperature $T_{connection}$ constitutes a point of reference which is stored in the memory of the microprocessors incorporated in refrigerators or freezers of the same type. This point of reference will hereinafter be referred to as the "tabular" value.

This having been carried out, the self-regulating control device according to the invention operates as follows: the value $t_{r1}$ recorded during the 1st cycle (a, e, b) corresponds to the tabular comparison value, and therefore the control device is not activated (because the operating conditions are the same as the reference conditions). During the 2nd cycle (b, f, c), where it is assumed that the external temperature is higher than that at which the tabular value was determined, the time $t_{r2}$ during which the compressor 2 was not functioning was recorded and found to be less than the tabular value, therefore after comparison an error value was calculated; in this case the value was positive, which lead, during the subsequent cycle (c, g, d), to a lowering of the compressor disconnecting point "g" thus causing the time during which the compressor is not functioning (i.e. $t_{r3}$) to be equal to $t_{r1}$, i.e. the tabular value.

In the opposite case, i.e. where there is a lowering of the ambient temperature, the time measured will be less than the tabular value. The control device will calculate a negative error from the comparison and will correct this by increasing the compressor disconnection temperature in order to bring the compressor disconnection time into line with the tabulated value.

In the above example, two parameters were used, i.e. the temperature of the evaporator and the compressor disconnection time (or time during which the compressor was inactive). That is the time that it took for the temperature of the evaporator to reach the $T_{connection}$ value. The compressor connection (or active) time, i.e. the values $t_f$ or even both of the time values could also be used to regulate the temperature. In these cases the tabulated values established during the experiments will be a combination of those relating to the compressor connection time, the relationship between the connection and disconnection times, to the disconnection time and the connection time.

For reasons of clarity, some simplifications have been made with regard to the graphs in the diagrams shown as straight dotted lines and it is assumed (with regard to FIG. 3) that the passage from one disconnection temperature to another, i.e. e, f, a, g took place in one, rather than several cycles.

It is obvious that, in theory, instead of changing the disconnection temperature it would be possible to change the connection temperature $T_{connection}$ making the necessary correlation.

We claim:

1. A self-regulating device for controlling refrigerating appliances, such as refrigerators and freezers, preferably domestic appliances, comprising:

a refrigerating circuit including a compressor, an evaporator and a condenser;

a temperature sensor placed in contact with the evaporator; and a microprocessor unit for controlling the compressor wherein the microprocessor records and processes the temperature of the evaporator and at least one of the following parameters: compressor connection time ($t_f$), compressor disconnection time ($t_r$) and compares the time(s) with one or more tabulated values, in order to ensure that the disconnection time ($t_r$) for the compressor reaches and maintains, by self-regulation, a constant predetermined tabulated value.

2. The self-regulating device as claimed in claim 1, in which the tabulated values are determined by experiments carried out on appliances used as a reference at a given predetermined reference temperature.

3. The self-regulating device as claimed in claim 1, in which the timer which measures the compressor connection and/or disconnection time is operated by the microprocessor, and in which the assembly formed by the evaporator, timer and temperature sensor placed on the evaporator constitutes a sensor which records the variations in the heat dispersion of the appliance.

4. The self-regulating device as claimed in claim 1, in which a plate type evaporator is used.

5. A method for controlling the operation of a compressor in refrigerating circuit including an evaporator and condenser and wherein a temperature sensor is placed in contact with the evaporator, the compressor is energized during a compressor connect time ($t_f$) until the evaporator reaches a predetermined disconnection temperature ($T_{disconnection}$) and the compressor is de-energized during a compressor disconnect time ($t_r$) until the evaporator reaches a predetermined connection temperature ($T_{connection}$), the method comprising the steps of:

sensing the temperature of the evaporator;

measuring the compressor disconnect time ($t_r$);

comparing the compressor disconnect time ($t_r$) with a predetermined tabular value; and modifying the disconnection temperature ($T_{disconnection}$) to ensure that the measured compressor disconnect time ($t_r$) is in accord with the predetermined tabular value, wherein the operation of the compressor is optimised in accord with the operating environment.

6. The method for controlling the operation of a compressor according to claim 5, further comprising the steps of:

lowering the disconnection temperature ($T_{disconnection}$) if the measured disconnect time ($t_r$) is less than the predetermined tabulated value.

7. The method for controlling the operation of a compressor according to claim 5, further comprising the steps of:

raising the disconnection temperature ($T_{disconnection}$) if the measured disconnect time ($t_r$) is more than the predetermined tabulated value.

8. A method for controlling the operation of a compressor in refrigerating circuit including an evaporator and condenser and wherein a temperature sensor is placed in contact with the evaporator, the compressor is energized during a compressor connect time ($t_f$) until the evaporator reaches a predetermined disconnection temperature ($T_{disconnection}$) and the compressor is de-energized during a compressor disconnect time ($t_r$) until the evaporator reaches a predetermined connection temperature ($T_{connection}$) the method comprising the steps of:

sensing the temperature of the evaporator;

measuring the compressor disconnect time ($t_r$) or the compressor connect time ($t_f$) for determining the heat dispersion of the refrigeration circuit;

modifying the disconnection temperature ($T_{disconnection}$) to ensure that the measured compressor disconnect time ($t_r$) is in accord with the predetermined tabular value, wherein the operation of the compressor is optimised in accord with the operating environment.

9. The method for controlling the operation of a compressor according to claim 8, further comprising the steps of:

lowering the disconnection temperature ($T_{disconnection}$) if the determined heat dispersion rate of the refrigeration circuit is greater than normal heat dispersion rate under which the predetermined tabular value was calculated.

10. The method for controlling the operation of a compressor according to claim 8, further comprising the steps of:

raising the disconnection temperature ($T_{disconnection}$) if the determined heat dispersion rate of the refrigeration circuit is less than normal heat dispersion rate under which the predetermined tabular value was calculated.

* * * * *